United States Patent

Smith et al.

(12) United States Patent
(10) Patent No.: US 12,543,163 B2
(45) Date of Patent: Feb. 3, 2026

(54) SCALE BY USING A TIERED MULTI-LEVEL SCHEDULING APPROACH

(71) Applicant: Cisco Technology, Inc., San Jose, CA (US)

(72) Inventors: Malcolm Muir Smith, Richardson, TX (US); Brian D. Hart, Sunnyvale, CA (US)

(73) Assignee: Cisco Technology, Inc.

( * ) Notice: Subject to any disclaimer, the term of this patent is extended or adjusted under 35 U.S.C. 154(b) by 382 days.

(21) Appl. No.: 18/172,019

(22) Filed: Feb. 21, 2023

(65) Prior Publication Data

US 2024/0284437 A1    Aug. 22, 2024

(51) Int. Cl.
*H04W 72/121*    (2023.01)
*H04W 40/24*    (2009.01)

(52) U.S. Cl.
CPC ....... *H04W 72/121* (2013.01); *H04W 40/246* (2013.01)

(58) Field of Classification Search
CPC . H04W 72/121; H04W 40/246; H04W 84/12; H04W 72/27; H04W 48/20
USPC .......................................................... 370/329
See application file for complete search history.

(56) References Cited

U.S. PATENT DOCUMENTS

| 2011/0223952 A1 | 9/2011 | Nanda et al. | |
| 2016/0050684 A1* | 2/2016 | Ni | H04W 72/12 370/329 |
| 2017/0202005 A1 | 7/2017 | Mada et al. | |
| 2019/0200373 A1 | 6/2019 | Becvar et al. | |
| 2020/0389808 A1* | 12/2020 | Wong | H04W 28/0236 |
| 2021/0120427 A1 | 4/2021 | Wang et al. | |
| 2022/0338066 A1 | 10/2022 | Chitrakar et al. | |
| 2023/0328622 A1* | 10/2023 | Park | H04W 16/28 370/328 |

FOREIGN PATENT DOCUMENTS

| WO | 2021075725 A1 | 4/2021 |
| WO | 2022051408 A1 | 3/2022 |

OTHER PUBLICATIONS

International Search Report and Written Opinion for International Application No. PCT/US2024/016627, mailed Jun. 11, 2024, 18 Pages.

* cited by examiner

Primary Examiner — Kwang B Yao
Assistant Examiner — Syed M Bokhari
(74) Attorney, Agent, or Firm — Merchant & Gould P.C.

(57) ABSTRACT

Scaling by using tiered multi-level scheduling may be provided. Connectivity information associated with a plurality of Access Points (APs) may be received by a computing device. A plurality of Connectivity Groups (CGs) may be determined from the plurality of APs based on the connectivity information. Transmissions may be scheduled for the plurality of CGs such that when any of the plurality of CGs sends a transmission, the transmission is substantially unaffected by interference from any others of the plurality of CGs.

20 Claims, 3 Drawing Sheets

SCALE BY USING A TIERED MULTI-LEVEL SCHEDULING APPROACH

TECHNICAL FIELD

The present disclosure relates generally to improved scaling by using a tiered multi-level scheduling approach.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
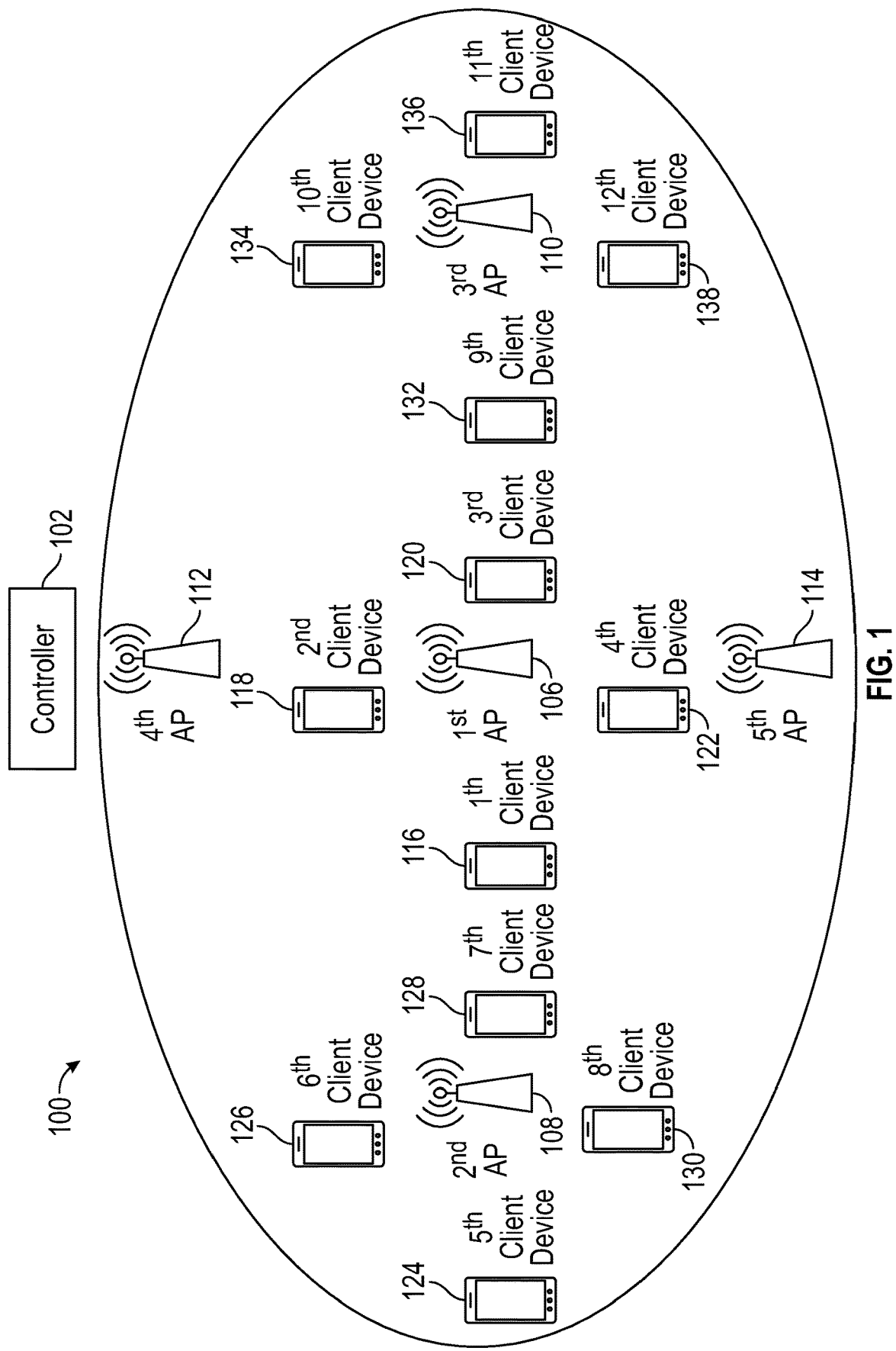
FIG. 1 is a block diagram of an operating environment for providing scaling by using tiered multi-level scheduling.

Scaling by using tiered multi-level scheduling may be provided. Connectivity information associated with a plurality of Access Points (APs) may be received by a computing device. A plurality of Connectivity Groups (CGs) may be determined from the plurality of APs based on the connectivity information. Transmissions may be scheduled for the plurality of CGs such that when any of the plurality of CGs sends a transmission, the transmission is substantially unaffected by interference from any others of the plurality of CGs.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Wi-Fi 7/8 may inherently consider all co-channel APs or overlapping Basic Service Set (BSS) Groups (OGs) in Multi-Access Point Coordination (MAPC) coordination (time, space, etc.) activity for a given AP (e.g., all the beacons it may hear). For an enterprise (e.g., multi-floor building), this may result in many APs being considered for a Coordination Group (CG) or, due to connectivity, may only result in a small subset. Similarly, each AP may also be connected to multiple OG/CGs based on Radio Frequency (RF) connectivity and different wired switching networks based on Ethernet connectivity. The net result may potential be coordination conflicts between neighboring APs and CGs. Scheduling may also impaired because each AP may have its own oscillator with some individual, time-varying offset, thus it may be difficult to get a precise agreement on a common time base.

Embodiments of the disclosure may scale by using a tiered multi-level scheduling approach (e.g., 2-level with one Multi-Access Point (MAP) coordinator per floor manages a set of CGs and a central MAPC coordinator per building). Embodiments of the disclosure may reduce complexity both within a CG or between CGs. This may be critical due to a large number of co-channel APs each AP may be connected to.

FIG. 1 shows an operating environment 100 for providing scaling by using tiered multi-level scheduling. As shown in FIG. 1, operating environment 100 may comprise a controller 102 and a coverage environment 104. Coverage environment 104 may comprise, but is not limited to, a Wireless Local Area Network (WLAN) comprising a plurality of Access Points (APs) that may provide wireless network access (e.g., access to the WLAN for client devices). The plurality of APs may comprise a first AP 106, a second AP 108, a third AP 110, a fourth AP 112, and a fifth AP 114. The plurality of APs may provide wireless network access to a plurality of client devices as they move within coverage environment 104. While FIG. 1 shows five APs, embodiments of the disclosure may comprise any number of APs. Furthermore, subsets of the plurality of AP may be respectively distributed in different floors of a building.

The plurality of client devices may comprise, but are not limited to, a first client device 116, a second client device 118, a third client device 120, a fourth client device 122, a fifth client device 124, a sixth client device 126, a seventh client device 128, an eighth client device 130, a ninth client device 132, a tenth client device 134, an eleventh client device 136, and a twelfth client device 138. While FIG. 1 shows twelve client devices, embodiments of the disclosure may comprise any number of client devices. Furthermore, subsets of the plurality of client devices may be respectively distributed in different floors of the building. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, Virtual Reality (VR)/Augmented Reality (AR) devices, or other similar microcomputer-based device. Each of the plurality of APs may be compatible with specification standards such as, but not limited to, the Institute of Electrical and Electronics Engineers (IEEE) 802.11ax specification standard for example.

Controller 102 may comprise a Wireless Local Area Network controller (WLC) and may provision and control coverage environment 104 (e.g., a WLAN). Controller 102 may allow the plurality of client devices to join coverage environment 104. In some embodiments of the disclosure, controller 102 may be implemented by a Digital Network Architecture Center (DNAC) controller (i.e., a Software-Defined Network (SDN) controller) that may configure information for coverage environment 104 in order to provide scaling by using tiered multi-level scheduling.

The elements described above of operating environment 100 (e.g., controller 102, first AP 106, second AP 108, third AP 110, fourth AP 112, fifth AP 114, first client device 116, second client device 118, third client device 120, fourth client device 122, fifth client device 124, sixth client device 126, seventh client device 128, eighth client device 130, ninth client device 132, tenth client device 134, eleventh client device 136, and twelfth client device 138) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
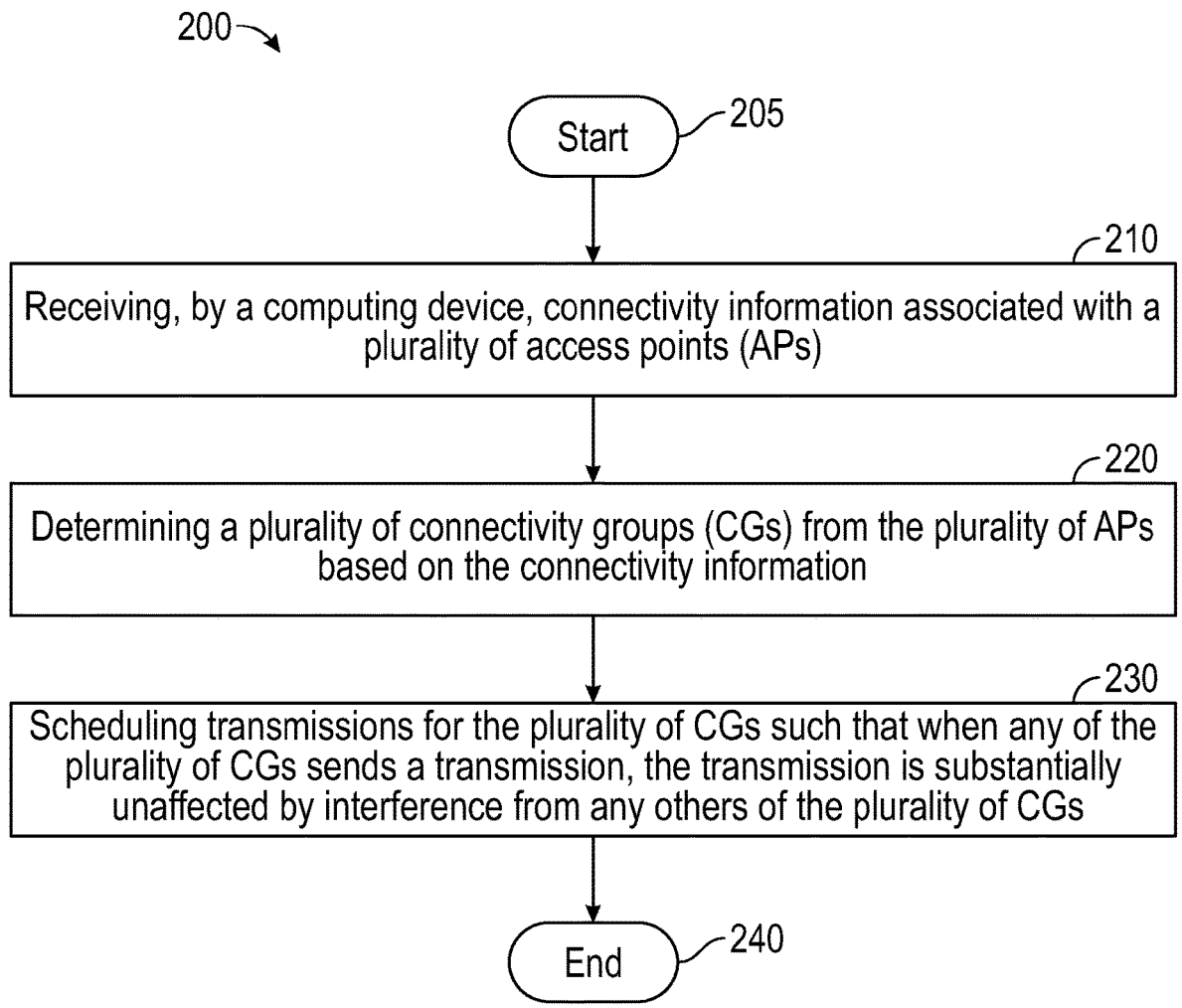
FIG. 2 is a flow chart of a method for providing scaling by using tiered multi-level scheduling.

FIG. 2 is a flow chart setting forth the general stages involved in a method 200 consistent with embodiments of the disclosure for providing scaling by using tiered multi-level scheduling. Method 200 may be implemented using controller 102 in conjunction with the plurality of APs as described in more detail above with respect to FIG. 1. Ways to implement the stages of method 200 will be described in greater detail below.

Method 200 may begin at starting block 205 and proceed to stage 210 where controller 102 may receive connectivity information associated with a plurality of Access Points (APs). For example, for N equal to all co-channel APs in a deployment, the N×N connectivity graph may be learned from a 1-hop neighborhood (e.g., first AP 106 hears second AP 108 via beacon or Neighbor Discovery Protocol (NDP) Received Signal Strength Indication (RSSI), or more generally any client device in a first Basic Service Set (BSS) hears any client device in a second BSS).

While the connectivity information may be associated with RSSI, information may be used. For example, a campus identifier, a building identifier, a floor level identifier, or an area (i.e., subset of floor) identifier. Connectivity information may further comprise parameters that support the determination of campus building/floor/area identifiers including a Global Navigation Satellite System (GNSS) fix, air pressure, wired connectivity information (e.g., identity of first attached switch), manually configured information, AP to AP range, such as measured by a ranging protocol such as Fine Time Measurement (FTM) or via Ultra-wideband (UWB). Furthermore, connectivity information may further comprise history of the connectivity information, for example, when or how RSSI, GNSS fix, air pressure, and range estimate changes over the recent past such as minutes, hours, days, or weeks. The connectivity information may be directly in forming CGs.

From stage 210, where controller 102 receives the connectivity information associated with the plurality of APs, method 200 may advance to stage 220 where controller 102 may determine a plurality of Connectivity Groups (CGs) from the plurality of APs based on the connectivity information. For example, the connectivity information (or inputs to determine this connectivity information) may be reported by each of the plurality of APs to a central MAP scheduler that may form a set of individually schedulable Coordination Groups (GGs). The central MAP scheduler may be disposed in controller 102 for example. In addition to the connectivity information, location data and enterprise planning data (e.g., floor number of AP) may be used to determine the plurality of CGs.

The central MAP scheduler may determine the CGS as follows. Given the maximum number of APs that a CG is capable of scheduling (i.e., within a certain compute, memory, and communications envelope), the central MAP scheduler may partition the set of APs into disjoint CGs according to the following metrics. If the deployment has more than the maximum number of APs per CG, then a process (e.g., simulated annealing, genetic algorithm, greedy algorithm, etc.) may be applied to split the deployment into CGs with relatively high RSSIs and same building and floor between APs within the CG and relatively weak RSSIs and different building floor between APs in different CGs.

For example, a greedy algorithm may be used to define each AP as a CG, then attempt to merge CGs by iterating as follows: i) at each iteration, find a pair of CGs with the highest RSSI between the CGs such that the sum cardinality of the two CGs does not exceed the maximum number of APs per CG and the CGs are both on the same floor of the same building; then ii) merge these CGs. Iterations may continue until no further CGs can be merged. Then, starting with the newly constructed CGs, repeat this process, but allow CGs to merge as long as they are within a same building (even if on different floors). Then, starting with this next set of CGs, repeat this process, but allow CGs to merge without regard to building. Furthermore, a highest RSSI may be defined as the highest RSSI between one AP/any client device in a BSS in one CG and another AP/any client device in a BSS in the other CG, or some broader metric such as the highest mean of RSSIs between all possible AP/BSS pairs, where each AP/BSS pair comprises one AP/BSS in one CG and another AP/BSS in the other CG.

Once controller 102 determines the plurality of CGs from the plurality of APs based on the connectivity information in stage 220, method 200 may continue to stage 230 where controller 102 may schedule transmissions for the plurality of CGs such that when any of the plurality of CGs sends a transmission, the transmission is substantially unaffected by interference from any others of the plurality of CGs. For example, the central MAP scheduler may determine that, if two CGs were to transmit at the same time, which APs/BSSs in the CG would and would not cause interference to APs/BSSs in the other CG (e.g., received at >−92 dBm). Then the central MAP scheduler may determines a schedule for the CGs such that when each CG transmits, the CG is substantially unaffected by interference from neighboring CGs. A transmission may be substantially unaffected by interference if most choices of bandwidth, number of spatial streams, and/or modulation and coding scheme continue to have an acceptably a low error rate. A transmission may also be substantially unaffected by interference if at worst a few choices of modulation and coding scheme with very high spectral efficiency have a heightened error rate.

In one embodiment, the central MAPC scheduler may divide the CGs into M subsets, where M equals max(number of interfering CGs)+1, assigns each CG into one of the M CG subsets, then defines the schedule as sequencing through each CG subset in turn. In another embodiment, the MAPC scheduler may schedule interfering CGs at the same time, but alternates APs/BSSs in an interference zone.

The aforementioned process may lead to one CG per floor in a building. Given this, a 2-tier scheduling approach may then be adopted where the central MAPC scheduler may allocate time/frequency resources first for the even floors then for the odd floors, which may have determined is sufficient to eliminate or minimize Co-Channel Interference (CCI) so as to avoid conflicts between CGs. Then a per-floor CG scheduler may do the same for the APs on its floor. This form of coordination may avoid conflicts that the Wi-Fi7 MAPC coordination may not avoid because there may be no explicit CG and no inter-OG coordination. Once controller 102 schedules transmissions for the plurality of CGs such that when any of the plurality of CGs sends the transmission, the transmission is substantially unaffected by interference from any others of the plurality of CGs in stage 230, method 200 may then end at stage 240.

In another embodiment of the disclosure, to overcome the scaling problems identified above, the disclosure may structure the APs in the OGs into a set of CGs that may be a subset of the former. In this embodiment, this structuring may be hierarchical as follows. An N×N connectivity graph may be learned from the 1-hop neighborhood (e.g., first AP 106 hears second AP 108 via beacon or NDP RSSI). This may be reported by each AP to its Coordination Group Leader (CGL) that may form a set of individually schedulable CGs as follows. All APs within a pre-defined threshold (e.g., −45 dBm RSSI) may be considered in the same CG. This threshold may be estimated from an enterprise Radio Resource Management (RRM) because channels and bandwidth may be assigned to each AP based on relative RSSI. APs considered non-interfering (e.g., −85 dBm RSSI) may be used to form disjoint CG sets. These disjoint sets may be further structured with the aid of location data and enterprise planning data (e.g., floor number of AP) resulting in same-floor CGs and thus neighboring-floors with sets of CGs.

Figure 3:
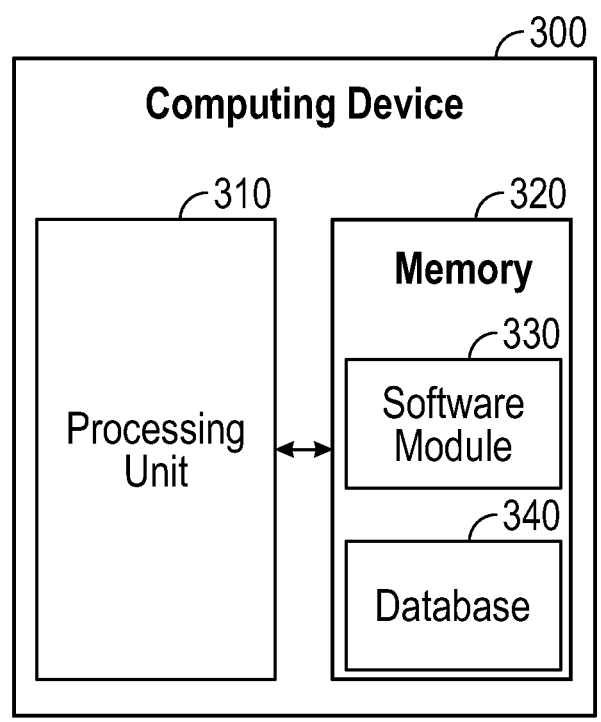
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing scaling by using tiered multi-level scheduling as described above with respect to FIG. 2. Computing device 300, for example, may provide an operating environment for controller 102, first AP 106, second AP 108, third AP 110, fourth AP 112, fifth AP 114, first client device 116, second client device 118, third client device 120, fourth client device 122, fifth client device 124, sixth client device 126, seventh client device 128, eighth client device 130, ninth client device 132, tenth client device 134, eleventh client device 136, and twelfth client device 138. Controller 102, first AP 106, second AP 108, third AP 110, fourth AP 112, fifth AP 114, first client device 116, second client device 118, third client device 120, fourth client device 122, fifth client device 124, sixth client device 126, seventh client device 128, eighth client device 130, ninth client device 132, tenth client device 134, eleventh client device 136, and twelfth client device 138 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising: receiving, by a computing device, connectivity information associated with a plurality of Access Points (APs); determining a plurality of Connectivity Groups (CGs) from the plurality of APs based on the connectivity information, wherein determining the plurality of CGs from the plurality of APs based on the connectivity information comprises: defining each AP of the plurality of APs as a CG, determining a pair of CGs with a predetermined a Received Signal Strength Indication (RSSI) value between the pair of CGs such that a sum cardinality of the pair of CGs does not exceed a maximum number of APs per CG, merging the pair of CGs to form a next CG, determining a pair of next CGs with the predetermined the RSSI value between the pair of next CGs such that the sum cardinality of the pair of next CGs does not exceed the maximum number of APs per CG, and merging the pair of next CGs to form a new CG; and scheduling transmissions for the plurality of CGs such that when any of the plurality of CGs sends a transmission, the transmission is substantially unaffected by interference from any others of the plurality of CGs.

2. The method of claim 1, wherein receiving the connectivity information comprises receiving Received Signal Strength Indication (RSSI) values that each of the plurality of AP receives others of the plurality of APs at.

3. The method of claim 1, wherein determining the plurality of CGs comprises determining one of the plurality of CGs respectively for corresponding floors of a building.

4. The method of claim 1, wherein determining the plurality of CGs comprises determining the plurality of CGs based on known locations of the plurality of APs.

5. The method of claim 1, wherein scheduling transmissions comprises coordinating transmissions on a floor basis.

6. The method of claim 1, wherein scheduling transmissions comprises coordinating transmissions on a floor basis by a first scheduler.

7. The method of claim 6, further comprising coordinating transmissions of APs on a floor by a second scheduler.

8. The method of claim 1, wherein scheduling the transmissions comprises:
   dividing the plurality of CGs into a plurality of subsets; and
   sequencing the transmissions through each CG subset in turn.

9. A system comprising: a memory storage; and a processing unit coupled to the memory storage, wherein the processing unit is operative to: receive connectivity information associated with a plurality of Access Points (APs); determine a plurality of Connectivity Groups (CGs) from the plurality of APs based on the connectivity information, wherein the processing unit being operative to determine the plurality of CGs from the plurality of APs based on the connectivity information comprises the processing unit being operative to: define each AP of the plurality of APs as a CG, determine a pair of CGs with a predetermined a Received Signal Strength Indication (RSSI) value between the pair of CGs such that a sum cardinality of the pair of CGs does not exceed a maximum number of APs per CG, merge the pair of CGs to form a next CG, determine a pair of next CGs with the predetermined the RSSI value between the pair of next CGs such that the sum cardinality of the pair of next CGs does not exceed the maximum number of APs per CG, and merge the pair of next CGs to form a new CG; and schedule transmissions for the plurality of CGs such that when any of the plurality of CGs sends a transmission, the transmission is substantially unaffected by interference from any others of the plurality of CGs.

10. The system of claim 9, wherein the processing unit being operative to receive the connectivity information comprises the processing unit being operative to receive Received Signal Strength Indication (RSSI) values that each of the plurality of AP receives others of the plurality of APs at.

11. The system of claim 9, wherein the processing unit being operative to determine the plurality of CGs comprises the processing unit being operative to determine one of the plurality of CGs respectively for corresponding floors of a building.

12. The system of claim 9, wherein the processing unit being operative to determine the plurality of CGs comprises the processing unit being operative to determine the plurality of CGs based on known locations of the plurality of APs.

13. The system of claim 9, wherein the processing unit being operative to schedule transmissions comprises the processing unit being operative to coordinate transmissions on a floor basis.

14. The system of claim 9, wherein the processing unit being operative to schedule transmissions comprises the processing unit being operative to coordinate transmissions on a floor basis by a first scheduler.

15. The system of claim 14, wherein the processing is further operative to coordinate transmissions of APs on a floor by a second scheduler.

16. The system of claim 9, wherein the processing unit being operative to schedule the transmissions comprises the processing unit being operative to:
divide the plurality of CGs into a plurality of subsets; and
sequence the transmissions through each CG subset in turn.

17. A method comprising: receiving, by a Coordination Group Leader (CGL) Access point (AP) from a plurality of APs, a Received Signal Strength Indication (RSSI) value that each of the plurality of AP receives others of the plurality of APs at; determining, by the CGL AP, a Coordination Group (CG) from the plurality of APs based on the RSSI value that each of the plurality of AP receives others of the plurality of APs at, wherein determining the CG from the plurality of APs based on the RSSI value comprises: forming the CG of all APs having the RSSI value that each of the APs receives others of the APs at is within a first pre-defined threshold value, and forming disjoint CG sets, each disjoint CG sets comprising one or more APs having the RSSI value that each of the one or more APs receives others of the one or more APs at is within a second pre-defined threshold value, the second pre-defined threshold value being less than the first pre-defined value; and scheduling transmissions for the CG.

18. The method of claim 17, wherein determining the CG comprises including ones of the plurality of APs in the CG that have the RSSI value that is stronger than a predetermined first threshold.

19. The method of claim 17, wherein determining the CG comprises excluding ones of the plurality of APs from the CG that have the RSSI value that is weaker than a predetermined second threshold.

20. The method of claim 17, wherein determining the CG comprises using location data associated with the plurality of APs.

* * * * *